United States Patent [19]

Stoneham

[11] 3,955,205

[45] May 4, 1976

[54] FILM ADVANCE-FLASH INTERLOCK MECHANISM

[75] Inventor: Jeffrey Richard Stoneham, Hilton, N.Y.

[73] Assignee: Eastman Kodak Company, Rochester, N.Y.

[22] Filed: Mar. 10, 1975

[21] Appl. No.: 557,195

[52] U.S. Cl................................. 354/135; 354/142
[51] Int. Cl.² ..................... G03B 15/03; F21K 5/02
[58] Field of Search .......... 354/135, 142, 126, 129, 354/149; 240/1.3

[56] References Cited
UNITED STATES PATENTS

| | | | |
|---|---|---|---|
| 3,672,813 | 6/1972 | Horton | 354/142 |
| 3,677,153 | 7/1972 | Bok | 354/135 |
| 3,690,236 | 9/1972 | Ettischer | 354/142 |
| 3,735,679 | 5/1973 | Winkler | 354/135 X |

*Primary Examiner*—L. T. Hix
*Assistant Examiner*—E. M. O'Connor
*Attorney, Agent, or Firm*—T. H. Close

[57] ABSTRACT

A mechanism for energizing a piezoelectric firing spring, cocking a camera shutter drive mechanism and advancing film within the camera is adapted to prevent short-stroke operation of the camera during movement of the piezoelectric firing spring to its fully energized position. The mechanism comprises a blocking member that is biased toward a blocking position wherein the blocking member prevents return of the film advance mechanism to its rest position. Movement of the piezoelectric firing spring to its fully energized position moves the blocking member from its blocking position.

3 Claims, 6 Drawing Figures

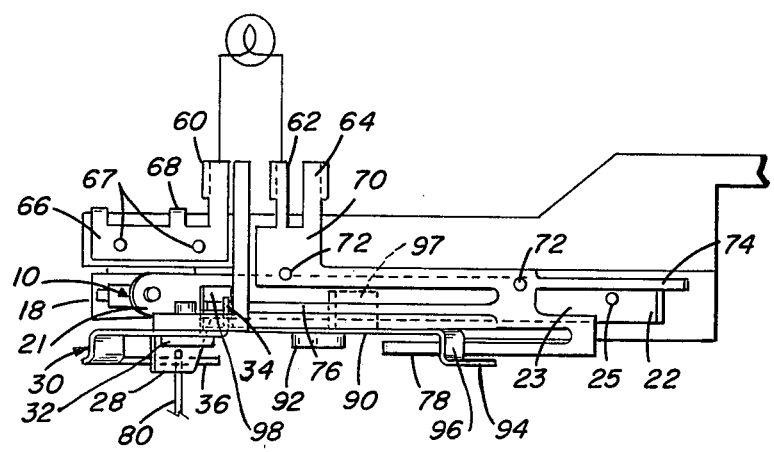
FIG. 1
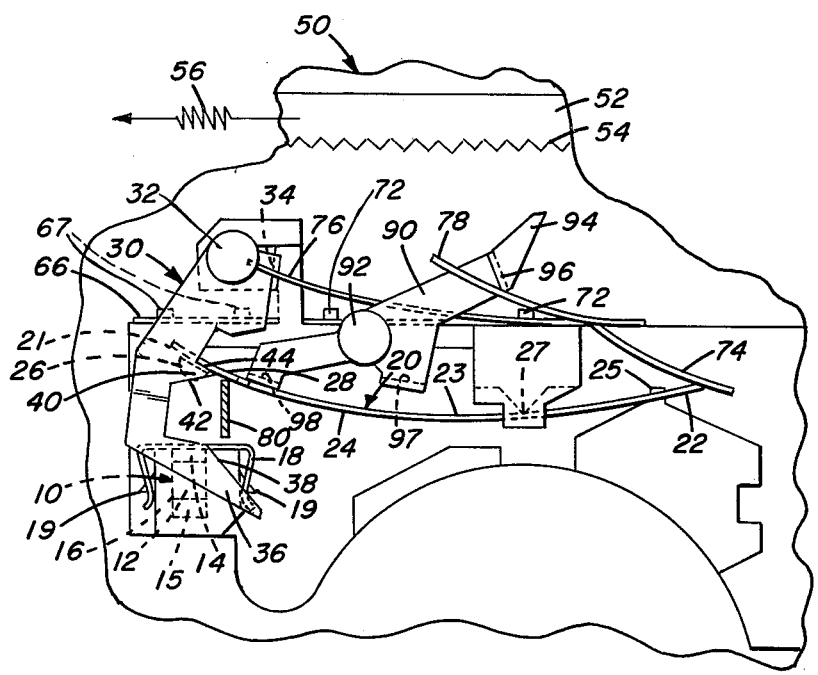
FIG. 2
FIG. 3

FILM ADVANCE-FLASH INTERLOCK MECHANISM

CROSS-REFERENCE TO RELATED APPLICATIONS

Reference is made to commonly assigned, copending U.S. patent applications Ser. No. 528,529, filed Nov. 29, 1974 in the names of Jerry L. Hargrave and Harold L. Malone and entitled CAMERA FLASH SOCKET; Ser. No. 528,528, filed Nov. 29, 1974 in the name of Robert F. O'Brien and entitled PIEZO CRYSTAL HOUSING AND MOUNT and Ser. No. 528,305, filed Nov. 29, 1974 in the names of Jeffrey R. Stoneham and Thomas E. Dussinger, and entitled FILM ADVANCE-FLASH INTERLOCK MECHANISM.

BACKGROUND OF THE INVENTION

1. Field of the Invention

The present invention relates to photographic apparatus and, in particular, to an improved mechanism for insuring movement of a piezoelectric firing spring to a latched position in such apparatus.

2. Description of the Prior Art

It is known in the photographic arts to provide for the ignition of a flashlamp by means of an electric pulse generated by a piezoelectric crystal and to provide for the synchronization of such flash ignition with shutter operation of a camera. See U.S. Pat. Nos. 2,856,564; 2,972,937 and 3,106,080. More recently, apparatus has been developed in which a plurality of flashlamps, fireable by electric energy generated by a piezoelectric crystal, are assembled into a multilamp array. In one such array, as is disclosed more fully in the referenced, co-pending U.S. application Ser. No. 528,529, entitled CAMERA FLASH SOCKET, all of the lamps are aligned in the same direction and each lamp has its own reflector, with a switching mechanism internal to the array for firing a particular lamp.

As the piezoelectric crystal is to be struck repeatedly, it becomes necessary and desirable to provide mechanisms for striking the crystal within the camera so that a multitude of electric pulses of substantially the same magnitude and duration may be produced and for coordinating such mechanisms with other camera functions. One such mechanism is disclosed in the referenced, co-pending U.S. application Ser. No. 528,305, entitled FILM ADVANCE-FLASH INTERLOCK MECHANISM. In that mechanism, a single latch member is utilized to maintain a piezoelectric firing spring in its latched position prior to actuation of the camera's shutter drive mechanism and to prevent short-stroke operation of the film advance mechanism prior to return of the piezoelectric firing spring to its latched position. While effective, this mechanism depends upon proper positioning of the latch member to prevent short stroke operation and thus requires a relatively heavy latch member to minimize unwanted movements during camera operation. Such a construction increases the force required to be exerted by the shutter drive mechanism in order to properly release the latch mechanism for flash synchronization, an increase which is undesirable in combination with other forces present in the camera.

SUMMARY OF THE INVENTION

The present invention provides photographic apparatus including a shutter actuator, a piezoelectric firing spring, a latch, a film advance mechanism and a blocking member. The film advance mechanism includes a film advance slide that is movable from a rest position for advancing film. Movement of the film advance slide effects movement of the piezoelectric firing spring to its latched position and may also move the shutter actuator lever to an energized position. A latch is provided having a first arm engageable by the shutter actuator to move the latch to its unlatching position and a second arm engageable with the piezoelectric firing spring to retain the piezoelectric firing spring in its latched position. A blocking member is provided that is engageable by the piezoelectric firing spring and movable therewith from a blocking position to an unblocking position. In its blocking position, the blocking member engages the film advance slide to prevent return of the film advance slide to its rest position prior to movement of the piezoelectric firing spring to its latched position. Movement of the piezoelectric firing spring to its latched position moves the blocking member to its unblocking position.

DESCRIPTION OF THE DRAWINGS

In the detailed description of the photographic apparatus presented below, reference is made to the accompanying drawings, in which:

FIG. 1 is a front view of a portion of a camera incorporating the mechanism of the present invention;

FIG. 2 is a top view of the mechanism illustrated in FIG. 1 with the piezoelectric firing spring in its latched position;

FIG. 3 is a side view of the mechanism as illustrated in FIGS. 1 and 2;

DESCRIPTION OF THE PREFERRED EMBODIMENT

Figure 4:
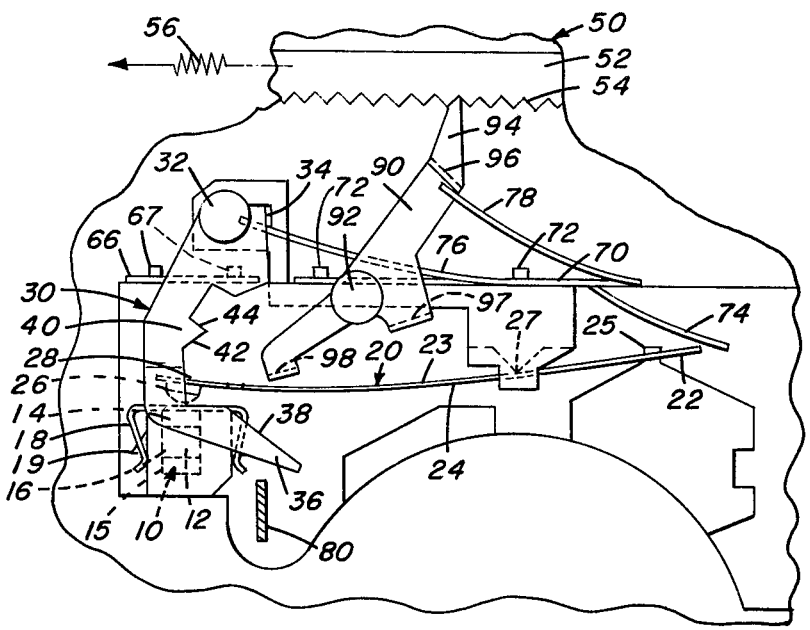
FIG. 4 is a top view of the mechanism with the piezoelectric firing spring in its striking position.

Because photographic apparatus is well known, the present description will be directed in particular to elements forming part of, or cooperating more directly with, the present invention. Elements not specifically shown or described herein are understood to be selectable from those known in the art.

Referring now to the drawings, a photographic camera is illustrated, in part, which includes a piezoelectric generator 10, a piezoelectric firing spring 20, a latch 30, a film advance mechanism 50, a shutter actuator 80 and a blocking member 90. Piezoelectric generator 10 includes a piezoelectric crystal 12, first anvil 14 and second anvil 15. Piezoelectric generator 10 is formed by inserting second anvil 15, piezoelectric crystal 12 and first anvil 14 into a recess 16 within the camera. Piezoelectric generator 10 is retained within the camera by means of a spring clip 18 that engages a portion of first anvil 14 along with a pair of retaining lugs 19 that are fixed within the camera. Alternatively, piezoelectric generator 10 could be preassembled into a unitary package for insertion into recess 16 within the camera, such as is described more fully in referenced, U.S. application Ser. No. 528,528, entitled PIEZO CRYSTAL HOUSING AND MOUNT.

Piezoelectric firing spring 20 is an elongated leaf spring having opposed ends 21 and 22 and opposite surfaces 23 and 24. Piezoelectric firing spring 20 is movably mounted within the camera by means of a pin 25, which is fixed within the camera and which is received in an opening in end 22, and by a knife edge 27, which bears against surface 23 of piezoelectric firing spring 20 between ends 21 and 22 to provide a fulcrum. A hammer 26 is mounted on surface 24 of piezoelectric firing spring 20 near end 21, which also includes a latching lug 28 adjacent hammer 26.

Latch 30 is movably mounted on a pin 32, fixed within the camera, and includes a spring lug 34, a first arm 36 having a first cam surface 38, and a second arm 40 having a second cam surface 42 and a latch surface 44.

Mounted within the camera is a film advance mechanism 50, which includes a film advance slide 52 having a rack gear 54. Film advance mechanism 50 is biased to the left to a rest position by a spring 56. Rack gear 54 is designed to engage with and drive the film advance gear train of the camera during operation of film advance mechanism 50 by the photographer. Many such film advance gear trains are known in the art, such as is shown in U.S. Pat. No. 3,736,854, and any of these may be utilized with the film advance-flash interlock mechanism of the present invention.

Figure 5:
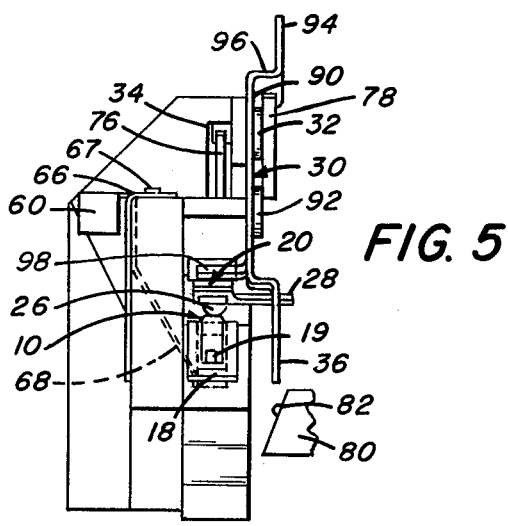
FIG. 5 is a side view of the mechanism as illustrated in FIG. 4.

FIG. 1 also illustrates the electrical connection of piezoelectric generator 10 to a flash unit which, while not essential to the operation of the film advance-flash interlock mechanism of the present invention, may be used with that mechanism. In the flash socket of the camera, as is more fully disclosed in the referenced co-pending U.S. patent application Ser. No. 528,529, entitled CAMERA FLASH SOCKET, three contacts are provided, 60, 62 and 64. Contact 60 is integrally formed with a contact strip 66, fixedly mounted within the camera by pins 67, and with a resilient portion 68 that is biased into contact with a portion of second anvil 15 (FIG. 5). Contacts 62 and 64 are joined to a common contact strip 70, fixedly mounted within the camera by means of pins 72, that includes a contact end 74, a spring end 76 and a spring end 78. As best seen in FIGS. 2 and 4, contact end 74 is urged into engagement with end 22 of piezoelectric firing spring 20 by means of their resiliency. In a preferred embodiment, piezoelectric firing spring 20 and hammer 26 are formed of electrically conducting materials so that electrical connection is established between first anvil 14 and contacts 62 and 64 through hammer 26, piezoelectric firing spring 20, end 22 and contact end 74 to contact strip 70. Concurrently, electrical connection is established between second anvil 15 and contact 60 through resilient portion 68 and contact strip 66. Thus, when hammer 26 strikes first anvil 14, an electrical circuit is completed for directing an electric pulse from piezoelectric generator 10 to contacts 60 and 62 in the camera socket. Spring end 76 engages spring lug 34 and biases latch 30 in a counterclockwise direction about pin 32.

Blocking member 90 is movably mounted on a pin 92, fixed within the camera, and includes a pawl 94, a spring lug 96, a limit lug 97 and a sensing lug 98. Spring end 78 on contact strip 70 engages spring lug 96 and biases blocking member 90 in a counterclockwise direction about pin 92 toward a blocking position illustrated in FIG. 4, in which pawl 94 engages rack gear 54.

Figure 6:
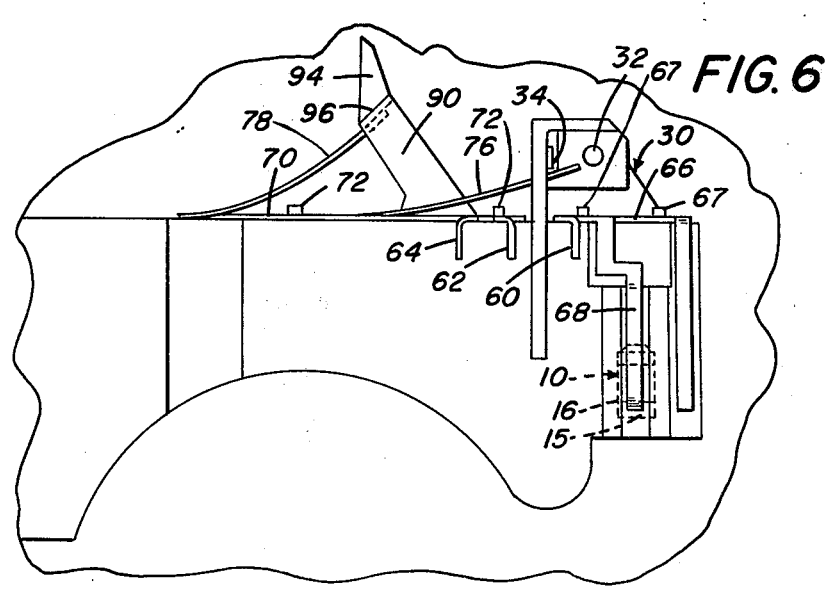
FIG. 6 is a rear view of the mechanism as illustrated in FIGS. 4 and 5.

The flash actuating mechanism, as illustrated in FIGS. 1-3, is in its latched position. Latch surface 44 engages latching lug 28 and retains piezoelectric firing spring 20 in its latched position in which piezoelectric firing spring 20 is flexed across knife-edge 27. Simultaneously, spring end 76 biases latch 30 in a counterclockwise direction to retain piezoelectric firing spring 20 in its latched position and sensing lug 98 engages piezoelectric firing spring 20 to retain blocking member 90 in its unblocking position as shown in FIG. 2. It should be noted that piezoelectric firing spring 20 may be flexed in both its latched position (FIGS. 1-3) and its striking position (FIGS. 4-6) so that it may be held within the camera by pin 25 and knife-edge 27.

When the operator desires to take a flash illuminated picture, a multilamp flash array or electronic flash unit is inserted in the camera socket. During subsequent exposure operation of the camera, a shutter actuator or high energy lever is released to move to actuate the shutter. Many such mechanisms are known in the art, such as the high energy lever described in U.S. Pat. No. 3,736,854, and the disclosure of that U.S. pat. is hereby incorporated by reference. A portion of the shutter actuator, or high energy lever, shown generally as 80, will be moved in a downward direction into contact with the first cam surface 38 on first arm 36 of latch 30. Continued downward movement of shutter actuator 80 will cause clockwise rotation of latch 30 about pin 32 against the bias of spring end 76 until latch surface 44 is disengaged from latching lug 28 on piezoelectric firing spring 20. Piezoelectric firing spring 20 is now free to move to its striking position (FIG. 4) in which hammer 26 strikes first anvil 14, thereby causing generation of electrical energy by piezoelectric crystal 12. As has been described before, the electric pulse will be transmitted through hammer 26 and piezoelectric firing spring 20 to contact strip 70 and through resilient portion 68 to contact strip 66. The electrical pulse will thus be presented across contacts 60 and 62 to fire the flash lamp or electronic flash unit. In the event that no flash unit is present in the camera socket, the pulse will still be presented across contacts 60 and 62 but will not be utilized.

After release of piezoelectric firing spring 20, latch 30 moves to its unlatched position as best seen in FIG. 4, under the bias of spring end 76 against spring lug 34. Hammer 26 has struck first anvil 14. Blocking member 90 moves to its blocking position in which pawl 94 is in engagement with rack gear 54 on film advance slide 52. For subsequent operation of the camera, the operator will actuate film advance mechanism 50 so as to move film slide 52 and rack gear 54 to the right against the bias of spring 56. Such movement is permissible since rack gear 54 will merely move pawl 94 against the bias of spring end 78 on blocking member 90. However, return movement of film advance slide 52 to the left is not possible, so long as pawl 94 engages rack gear 54. Operation of film advance mechanism 50 moves shutter actuator 80 upwardly using any well known coupling mechanism, such as that of U.S. Pat. No. 3,736,854. Initial upward movement of shutter actuator 80 brings cam surface 82 into engagement with first arm 36 which flexes to permit shutter actuator 80 to pass. Further movement brings shutter actuator 80 into engagement with latching lug 28 on piezoelectric firing spring 20 and will cause upward movement of piezoelectric firing spring 20. Piezoelectric firing spring 20 will engage sensing lug 98 on blocking member 90 and thereby cause blocking member 90 to begin to move away from its blocking position. Similarly, latching lug 28 will come into contact with second cam surface 42 on second arm 40, thereby causing latch 30 to be rotated in a clockwise direction against the bias of spring end 76 against spring lug 34. Continued upward movement of shutter actuator 80 and continued clockwise rotation of latch 30 will move latching lug 28 past the end of second cam surface 42. When this occurs, spring end 76 urges latch 30 in a counterclockwise direction to cause engagement of latch surface 44 with latching lug 28. Continued movement of blocking member 90 in a clockwise direction by engagement of sensing lug 98 and piezoelectric firing spring 20 will remove pawl 94 from engagement with rack gear 54 on film advance slide 52. Thus the engagement of pawl 94 with rack gear 54 prevents short stroke operation of film advance slide 52 prior to movement of piezoelectric firing spring 20 to its latched position in which pawl 94 is disengaged from rack gear 54. Film advance slide 52 may now return to the left to its rest position under the bias of spring 56 and the film advance-flash interlock mechanism will once again be in the position illustrated in FIGS. 1-3, ready for subsequent picture taking operation of the camera.

The invention has been described in detail with particular reference to a preferred embodiment thereof, but it will be understood that variations and modifications can be effected within the spirit and scope of the invention.

I claim:

1. A photographic camera comprising:
means, including a first member movable from a rest position, for advancing film within said camera;
means, including a piezoelectric crystal, for generating electrical energy;
means, including a second member movable from a latched position, for engaging said generating means to generate electrical energy;
means for releasably retaining said second member in said latched position;
means, coupling said first and second movable members, for moving said second member to its latched position in response to movement of said first member from its rest position;
a blocking member movable to a blocking position in which said blocking member prevents return of said first member to its rest position; and
means for moving said blocking member to said blocking position in response to movement of said second member from said latched position.

2. A photographic camera comprising:
means, including a slide movable from a rest position to a film advancing position, for advancing film within the camera;
means, including a piezoelectric crystal, for generating electrical energy;
a firing member including a hammer mounted thereon, said firing member being movable from a latched position to bring said hammer into engagement with said generating means and thereby generate electrical energy;
means, including a movable member, for moving said firing member to said latched position in response to movement of said slide from said rest position toward said film advancing position;
a latch movable from a latching position to an unlatching position, said latch maintaining said firing member in said latched position when said latch is in said latching position and said latch being movable to said unlatching position by said movable member;
a blocking member movable from a blocking position to an unblocking position, said blocking member being movable to said blocking position in response to movement of said firing member from said latched position and said blocking member being movable to said unblocking position in response to movement of said firing member to said latched position; and
means for moving said blocking member between said blocking and unblocking positions.

3. A photographic camera comprising:
a slide movable from a rest position;
means coupled to said slide for advancing film within the camera;
means, including a piezoelectric crystal, for generating electrical energy;
a firing spring having a hammer mounted thereon, said firing spring being movable from a latched position to bring said hammer into engagement with said generating means and thereby generate electrical energy;
a latch movable between a latching and an unlatching position, said latch releasably retaining said firing spring in said latched position when said latch is in said latching position;
a member movable to engage and move said firing spring to said latched position and further movable to engage and move said latch to said unlatching position;
means, coupling said slide and said movable member, for moving said movable member to engage and move said firing spring to said latched position in response to movement of said slide from said rest position;
means for moving said movable member to engage and move said latch to said unlatching position;
a blocking member movable between a blocking and an unblocking position, said blocking member being moved to said unblocking position by engagement with said firing spring during movement of said firing spring to said latched position and said blocking member being moved to said blocking position in response to movement of said firing spring from said latched position; and
a spring engaged with said blocking member to bias said blocking member toward said blocking position.

* * * * *